United States Patent [19]

Soreau et al.

[11] Patent Number: 4,590,228

[45] Date of Patent: May 20, 1986

[54] INJECTION COMPOSITION FOR FILLING OR REINFORCING GROUNDS

[75] Inventors: Michel Soreau, Montmorency; Daniel Siegel, Montesson, both of France

[73] Assignee: Societe Francaise Hoechst, Puteaux, France

[21] Appl. No.: 702,140

[22] Filed: Feb. 15, 1985

[51] Int. Cl.$^4$ .................. E02D 3/12; E21B 33/138
[52] U.S. Cl. .................. 523/131; 166/274; 166/293; 405/264; 523/130
[58] Field of Search .............. 523/130, 131, 132; 166/293; 524/442, 916

[56] References Cited

U.S. PATENT DOCUMENTS

| | | | |
|---|---|---|---|
| 2,562,867 | 7/1951 | Kurtz et al. | 523/130 |
| 3,028,340 | 4/1962 | Gandon et al. | 252/315.6 X |
| 3,306,758 | 2/1967 | Miller | 106/287.21 X |
| 3,437,625 | 4/1969 | Bonnel et al. | |
| 4,002,590 | 1/1977 | Yoshida et al. | 524/442 |
| 4,069,869 | 1/1978 | Sandiford | 166/294 X |
| 4,461,351 | 7/1984 | Falk | 523/130 X |

FOREIGN PATENT DOCUMENTS

| | | |
|---|---|---|
| 0028495 | 5/1981 | European Pat. Off. |
| 0078365 | 5/1983 | European Pat. Off. |
| 1400031 | 4/1965 | France |

OTHER PUBLICATIONS

International Polymer Science and Technology, vol. 3, No. 9, 9/76, pp. 66–67, D. M. Mashkov et al., "The Use of Solutions of Urea and Phenolic Resins for Soil Consolidation".

The Consulting Engineer, vol. 33, No. 10, Oct. 1969, pp. 35–37, "Chemical Grouting".

*Primary Examiner*—Herbert B. Guynn
*Attorney, Agent, or Firm*—Sheridan Neimark

[57] ABSTRACT

The invention relates to a composition of matter especially adapted to injection into the ground, comprising an alkali metal silicate and at least one water-soluble aminoplastic resin, wherein the aldehyde is selected from the group comprising formaldehyde, glyoxal and a mixture of glyoxal and formaldehyde, and the nitrogenous compound is urea.

2 Claims, No Drawings

INJECTION COMPOSITION FOR FILLING OR REINFORCING GROUNDS

This invention relates to a composition intended especially for injection into the ground either for filling in or strengthening it. More particularly, such composition is intended for preparing fluids for filling in storing-up rocks in oilfields.

Generally, upon assisted recovery of oil there is injected under pressure, through an injection well especially bored in the oil field, a displacement fluid for urging the residual crude oil contained in the storing rocks to the production well.

To obtain maximum oil recovery, permeability of the oilfields must be homogeneous, since otherwise the displacement fluid finds preferential ways through high permeability areas without penetrating less porous regions. In order to obviate such drawback it has been attempted to fill in the most permeable zones prior to injection of the displacement fluid.

To this end, filling in fluids have been used, containing gelifiable compounds such as those based on silica.

Filling in by silica gels has been known and used for assisted recovery of oil for many years (U.S. Pat. No. 3,375,872). It is generally effected in two steps, so that in a first step an aqueous solution of alkali metal silicate is injected into the oilfield and then, in a second step, such solution is gelified by injection of a reactive substance.

It is known to use aqueous solutions of sodium, potassium or lithium silicates with variable concentrations by weight from 0.1 to 10%, presenting various ratios of $M_2O/SiO_2$ (M representing the alkali metal) (U.S. Pat. Nos. 3,805,893, 3,882,938, 4,004,639, 4,069,869, 4,081,029).

The reactive gelification substance is either a mineral salt such as calcium chloride (U.S. Pat. No. 3,658,131), the ammonium sulfate (U.S. Pat. No. 4,069,869), or an organic halogenated derivative such as sodium trichloro-acetate, degradable by hydrolysis upon release of a hydracid (U.S. Pat. No. 4,293,440), or an aldehyde of a low molecular weight such as formaldehyde, glyoxal leading by Cannizzaro reaction to a carboxylic acid (U.S. Pat. No. 4,069,869).

Although such filling in methods have substantially improved production in old oilfields, constant increase in costs of oil products in recent years have led to searches for finding still more efficient filling in fluids.

The problem to be solved consisted in obtaining at the best price an atoxic filling fluid, gelifying in a controllable time variable from a few minutes to several hours, at variable temperatures from 40° C. to more than 100° C., for deep oilfields, giving a time stable gel with a high sealing capacity, i.e. having the lowest possible shrinkage and syneresis.

The gels from gelification of aqueous solution of organic polymers such as polysaccharides or polyacrylamides (Earl V. ANDERSON Chem. Eng. News, 12-3 Jan. 24, 1977) generally degrade slowly in the course of time and therefore are to be rejected.

Consequently, mineral polymer gels based on silica have been looked for. In order to transform an aqueous solution of alkaline metal silicate to a silica polymer gel it is necessary to use a reactive gelification substance, called hardener by the man of the art, and on which the qualities of the obtained gel partly depends. When such reactive gelification substance, is a metallic salt or an acid, too quick a gelification is obtained and due to this, the gel is poorly distributed in the storing rocks and injection of the filler is difficult or even impossible due to its increased viscosity.

Replacement of the metallic salt or the acid by an organic halogenated degradable product releasing a hydracid by hydrolysis practically does not lead to a gel but rather to an incoherent silica mass presenting a high syneresis rate probably due to too high an acidity. The hardeners based on aldehyde of a low molecular weight have themselves unacceptable setting time either too long in case of formaldehyde or too short in case of glyoxal, and in any case adjustable with difficulty for variable temperatures between 40° C. and more than 100° C.

The object of this invention is therefore to develop a satisfactory solution of the problem raised above, i.e. providing a fluid composition for injection into the ground either to consolidate or sealing it off, based on an aqueous solution of alkali metal silicate and capable of producing atoxic, not expensive gels of a high sealing capacity, of limited shrinkage, low syneresis rate, and stable in the course of time even if they are submitted to high temperatures and pressures, and having an adjustable setting time of a few minutes to several hours at temperatures of between 40° C. to more than 100° C.

The Applicant however has surprisingly found that certain water-soluble aminoplastic resins in which the aldehyde is formaldehyde, glyoxal or a mixture of glyoxal and formaldehyde, and the nitrogenous compound is urea in admixture with aqueous solutions of alkali metal silicates, produce such silica gels which are time stable even at high temperatures and pressures, and atoxic, little expensive, of a high sealing capacity, limited shrinkage, with low syneresis rates, and having high setting times.

Therefore the composition for injection into grounds according to this invention consists of an aqueous solution of alkali metal silicate and at least one water-soluble aminoplastic resin in which the aldehyde is selected from the group comprising formaldehyde, glyoxal and a mixture of glyoxal and formaldehyde, and the nitrogenous compound is urea.

The aqueous solutions of alkali metal silicate used are those usually employed in this field by the man of the art. Thus, a composition according to this invention contains, for 100 cm$^3$, from 10 to 30 cm$^3$ of a commercial aqueous solution of sodium silicate of a ratio by weight of $SiO_2/Na_2O$ equal to 3.35 and a density of between 1.36 and 1.38.

Experience shows that urea-glyoxal resins are particularly efficient within the temperature range of 40°–80° C. and that the urea-glyoxal-formaldehyde resins are well suited for higher temperatures of between 80° and 100° C. For temperatures higher than 100° C., urea-formaldehyde resins are preferred.

Water-soluble aminoplast resins of this type are known and used in the textile industry as finishing resins and some of them are described in the literature, for example (S. L. VAIL, Textile Research J., 1969, 39, 86–93; KIRK-OTHMER, Encyclopedia of Chemical Technology, 3rd edition, volume 2, pages 454–456, John Wiley and Sons, New York, 1979).

These water-soluble aminoplastic resins are prepared in a known manner for example by condensing, in aqueous medium at a pH of between 5 and 9, and at a temperature lower than 100° C., urea with either formaldehyde or glyoxal, or a mixture of glyoxal and formaldehyde, or successively glyoxal and then, formaldehyde. The molar proportions of these various constituents may vary in a wide range and these resins are generally obtained in aqueous solutions at concentrations that may reach in certain cases 70% by weight of dry materials.

Simple laboratory tests can easily determine the nature and quantity of water-soluble aminoplastic resins to be introduced into the aqueous solutions of alkali metal silicates to obtain the composition according to the invention having the desired setting time and syneresis rate at a given temperature.

These tests are effected at the selected temperature $\theta$ generally of between 40° and 100° C. with reactive previously heated to temperature $\theta$, in a series of wide-neck flasks provided with stoppers, and in which there was supplied for example 20 cm$^3$ of an aqueous solution of sodium silicate of a ratio by weight of 3.35 and a density of 1.36–1.38, then X grams of water-soluble aminoplastic resin and qs water to bring the final volume of the composition to 100 cm$^3$. The time interval between the preparation of the composition and its setting into mass, which is observable when it no longer flows upon turning upside down, defines the setting time. The syneresis rate is evaluated by measuring the liquid volume separated from the gel after 5 days-storage at the temperature $\theta$, and it is expressed in cm$^3$ for 100 cm$^3$ of gel.

Starting from the laboratory tests, various curves can be plotted such as those permitting calculation of the setting time depending on either the temperature or the quantities of water-soluble aminoplastic resins used. The very easy access to water-soluble aminoplastic resins such as described above and the simplicity of the tests for determining the setting times and the syneresis rates readily enable the man of the art to realize the composition according to the invention that solve his problem.

By way of example, one can obtain setting times of 80, 90 and 120 minutes and syneresis rates of zero at a temperature of 95° C. under the conditions described above, by respectively using 5, 4 and 3 grams of AR-KOFIX NG which is a commercial urea-glyoxal-formaldehyde resin; under the same conditions a setting time of 180 minutes and a syneresis rate of zero are obtained with 4 grams of commercial urea-formaldehyde resin having a molar ratio of formaldehyde to urea equal to 1.8. With 3 grams of a urea-glyoxal resin in aqueous solution at 50% by weight, having a molar ratio of glyoxal to urea equal to 2.1, there can be obtained under the above described conditions a setting time of 3 days at 40° C., of 380 minutes at 60° C., and 95 minutes at 80° C., with in all cases a syneresis rate lower than 5%.

The composition of this invention is very easily obtained merely by mixing its constituents. Usually, the selected water-soluble aminoplastic resin is dissolved in the desired quantity of commercial aqueous solution of alkali metal silicate; then if necessary, the obtained solution is brought to the desired concentration.

As mentioned above, the composition according to the invention, comprising an alkali metal silicate and at least one water-soluble aminoplastic resin of a urea-formaldehyde, urea-glyoxal or urea-glyoxal-formaldehyde condensation, is usable in particular for preparing filling in fluids for sealing porous grounds especially storing-up rocks in oilfields which are to be submitted to assisted recovery of oil. However, it can also be used successfully for consolidation of grounds, for example, on building tunnels, dams, and other underground structures of this type.

It will be understood that this invention was only described in a purely explanatory manner, not at all limitatively, and that any useful modification thereof can be effected without departing from its scope as defined in the appended claims.

We claim:

1. A composition for treating subsurface formations consisting essentially of an alkali metal silicate present as an aqueous solution and at least one water-soluble aminoplastic resin, wherein the aminoplastic resin is made from an aldehyde selected from the group consisting of formaldehyde, glyoxal, and mixtures thereof, and urea.

2. The composition of claim 1 wherein the aldehyde is a mixture of glyoxal and formaldehyde.

* * * * *